(12) United States Patent
Ghanwani et al.

(10) Patent No.: US 7,076,559 B1
(45) Date of Patent: Jul. 11, 2006

(54) SYSTEM, DEVICE, AND METHOD FOR ESTABLISHING LABEL SWITCHED PATHS ACROSS MULTIPLE AUTONOMOUS SYSTEMS

(75) Inventors: Anoop Ghanwani, North Billerica, MA (US); Andre Fredette, Groton, MA (US); Naganand Doraswamy, Arlington, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/473,103

(22) Filed: Dec. 28, 1999

(51) Int. Cl.
*G06F 15/16* (2006.01)
*H04L 12/66* (2006.01)

(52) U.S. Cl. ..................... 709/230; 370/352

(58) Field of Classification Search ............... 709/218, 709/238, 239, 240, 241, 242, 230, 236; 370/352, 370/392
See application file for complete search history.

(56) References Cited

U.S. PATENT DOCUMENTS

| | | | |
|---|---|---|---|
| 5,996,021 A * | 11/1999 | Civanlar et al. ............ 709/238 |
| 6,205,488 B1 * | 3/2001 | Casey et al. ............... 709/238 |
| 6,330,614 B1 * | 12/2001 | Aggarwal et al. .......... 709/236 |
| 6,339,595 B1 * | 1/2002 | Rekhter et al. ............ 370/392 |
| 6,341,127 B1 * | 1/2002 | Katsube et al. ............ 370/352 |
| 6,356,544 B1 * | 3/2002 | O'Connor .................. 370/353 |
| 6,374,303 B1 * | 4/2002 | Armitage et al. .......... 709/242 |
| 6,473,421 B1 * | 10/2002 | Tappan ....................... 370/351 |
| 6,501,760 B1 * | 12/2002 | Ohba et al. ............ 370/395.42 |
| 6,535,481 B1 * | 3/2003 | Andersson et al. ........ 370/225 |
| 6,563,793 B1 * | 5/2003 | Golden et al. ............. 370/236 |
| 6,765,921 B1 * | 7/2004 | Stacey et al. .............. 370/401 |
| 6,901,048 B1 * | 5/2005 | Wang et al. ................ 370/228 |
| 6,985,447 B1 * | 1/2006 | Gibson et al. ............. 370/255 |
| 6,987,727 B1 * | 1/2006 | Fredette et al. ............ 370/225 |

OTHER PUBLICATIONS

Ref. A: Evolution of multiprotocol label switching, Viswanathan, A.; Feldman, N.; Wang, Z.; Callon, R., Bells Labs, Lucent Technol., IEEE Communications Magazine, May 1998, pp. 165-173, ISSN: 0163-6804.*
Ref. B: Traffic engineering standards in IP-networks using MPLS, Ghanwani, A.; Jamoussi, B.; Fedyk, D.; Ashwood-Smith, P.; L Li Feldman, N.; Nortel Networks, IEEE Communications Magazine, Dec. 1999, pp. 49-53, ISSN: 0163-6804.*

(Continued)

*Primary Examiner*—Beatriz Prieto
(74) *Attorney, Agent, or Firm*—McGuinness & Manaras LLP (57) ABSTRACT

A system, device, and method for establishing label switched paths across multiple autonomous systems involves establishing a label switched path in each autonomous system, and, at each shared border device, linking an incoming label switched path in an incoming autonomous system to an outgoing label switched path in an outgoing autonomous system. The Label Distribution Protocol is preferably used to establish the label switched path between border devices in each autonomous system. Each border device maps a label associated with the incoming label switched path to a label associated with the outgoing label switched path. When a border device receives a protocol message including the label associated with the incoming label switched device, the border device replaces the label in the protocol message with the label associated with the outgoing label switched path, and forwards the protocol message to the downstream neighboring (next hop) device in the outgoing autonomous system.

15 Claims, 10 Drawing Sheets

OTHER PUBLICATIONS

Ref. C: Label switching and IP version 6, Boustead, P.; Barnett, S.; Chicharo, J.; Anido, G., Telecomm & Info. Technol. Res. Inst., Wollongong Univ. NSW, Australia, Computer Comm. & Networks, 1998, pp. 561-565, ISBN: 0-8186-9014-3.*

Ref. D: IETF Mulitprotocol Label Switching (MPLS) Architecture, Le Faucheur, F., Cisco Syst. Coutboeuf, France, IEEE, Jun. 1998, pp. 6-15, ISBN: 0-7803-7982-2.*

RFC 2547: BBGP/MPLS VPNs, Rosen, E. & Rekhter, Y., Cisco Systems, Inc., Mar. 1999, pp. 1-25.*

Multiprotocol Label Switching (MPLS), Ennovate Networks, Inc., 1998 pp. 1-47.*

Traffic Engineering for the New Public Network, Semeria, C., Marketing Eng. Juniper Networks, Jan. 1999, pp. 1-24.*

Quality of Service Routing, Martin van der Zee, ERICSSON, Jun. 1999, pp. 1-54.*

MPLS Virtusl Private Networks, Cisco IOS release 12.0(5)T, pp. 1-50.*

MPLS StudyGMD FOKUS, Research Institute for Open Communication Systems, Roth et al., Sep. 1999, pp. 1-42.*

Evolution of Multiprotocol Label Switching, Viswanathan et. al., IEEE Communications Magazine, May 1998, pp. 165-173.*

Evaluation of Label Mapping Policy for Aggregated Packet Flow in Label Switching Network, Nagami, K. et al., Jun. 1999, pp. 1-17 (http://www.isoc.org/inet99/proceedings/4g/4g_1.htm).*

Network Working Group Internet Draft: A Proposed Architecture for MPLS, Rosen, E. et al., Aug. 1997, pp. 1-58.*

Network Working Group Internet Draft: MPLS Lable Stack Encoding, Rosen, E. et al., Sept. 1998, pp. 1-21.*

Network Working Group Request for Comments (RFC-2547): BGP/MPLS VPNs, Rosen, E. et al., Mar. 1999, pp. 1-25.*

Evolution Of Multi-protocol Label Switching, Viswanathan, A., et al., IEEE Communication Magazine, 0163-6804/98, May 1998, p. 165-173.*

Supporting Differentiated Services in MPLS Networks, Andrikopoulos, I. & Pawlou, G., Centre of Communication Systems Research (CCSR), IEEE Communication Magazine, 0-7803-5671-3/99, p. 207-215.*

Label Switching and IP version 6, Intl Conf on Computer Comm & Networks, Boustead, P. et. al., Oct. 12-15, 1998, p. 561-565.*

RFC 2430: A Provider Architecture for Differentiated Services and Traffic Eng. (PASTE), Li, T., et al. Oct. 1998, p. 1-16.*

RFC 2547: BGP/MPLS VPNs, Rosen, E., et al., Mar. 1999, p. 1-25.*

RFC Internet Draft: CPE based VPNs using MPLS, Li, T., Juniper Networks, p. 1-4.*

MPLS Working Group, Internet Draft: MPLS VPN Architecture, Jamieson, D., et al., Aug. 1998, p. 1-16.*

Tag Switching Architecture Overview, Rekhter, Y., et al., IEEE Proc, vol. 85, No. 12, Dec. 1997, p. 1973-1983.*

Multi-protocol label switching in ATM networks, Hagard, G. & Wolf, M., Ericsson Review, No. 1, 1998.*

Callon et al., Internet Engineering Task Force (IETF) Internet Draft draft-ietf-mpls-framework-02.txt, A Framework for Multiprotocol Label Switching, Nov. 21, 1997.

Rosen et al., Internet Engineering Task Force (IETF) Internet Draft draft-ietf-mpls-arch-05.txt, Multiprotocol Label Switching Architecture, Apr. 1999.

Andersson et al., Internet Engineering Task Force (IETF) Internet Draft draft-ietf-mpls-ldp-04.txt, LDP Specification, May 1999.

* cited by examiner

PRIOR ART

FIG. 4

PRIOR ART

SYSTEM, DEVICE, AND METHOD FOR ESTABLISHING LABEL SWITCHED PATHS ACROSS MULTIPLE AUTONOMOUS SYSTEMS

FIELD OF THE INVENTION

The present invention relates generally to communication systems, and more particularly to establishing label switched paths across multiple autonomous systems using the Label Distribution Protocol (LDP).

BACKGROUND OF THE INVENTION

In today's information age, communication devices, such as computers and computer peripherals, are often internetworked over a communication network. A common networking model routes packets of information within the communication network using a networking protocol such as the Internet Protocol (IP) or other network layer protocol. Some networking protocols, such as IP, are considered to be "connectionless" networking protocols. In a connectionless networking protocol, each packet of information includes a network layer address, and each router forwards the packet of information based upon the network layer address according to a predetermined routing protocol such as the Open Shortest Path First (OSPF) protocol, the Routing Information Protocol (RIP), Hello, or other routing protocol.

Thus, each router makes an independent forwarding decision for the packet based upon the network layer address. Essentially, each router partitions the entire set of network layer addresses into a number of Forwarding Equivalence Classes (FECs), and each FEC is mapped to a particular outgoing path (or set of paths, in the case of multi-path routing) based upon the routing protocol. The router determines an FEC for each packet of information based upon the network layer address of the packet, and forwards the packet of information to the corresponding outgoing path (or set of paths).

Network layer routing requires each router to process each packet of information at the network layer. This is an expensive and time-consuming operation that limits the performance of some routers and even prevents certain devices that do not support the networking protocol from performing routing and other functions on the packets.

Label switching can be used to eliminate the network layer processing by certain devices in the communication network. Label switching enables a packet to be transported across a network domain (referred to hereinafter as an "autonomous system" or "AS") using labels rather than the network layer address. Specifically, a Label Switched Path (LSP) is established from an ingress point border device to an egress point border device in the AS. The LSP traverses a number of label switching devices. Each label switching device assigns a short, fixed-length value (i.e., a "label") to each FEC that is supports. When the packet enters the ingress point border device, the ingress point border device uses the network address to assign the packet to a particular FEC, and inserts the corresponding label into the packet, specifically within a packet header. Each subsequent label switching device along the LSP uses the label in the packet to determine the next hop FEC for the packet, and replaces the label in the packet with a new label corresponding to the next hop FEC for the packet. The egress point border device removes the label from the packet. Thus, only the ingress point border device processes the packet at the network layer, and subsequent devices process the packet based upon the label only.

The Internet Engineering Task Force (IETF) Multi-Protocol Label Switching (MPLS) working group has defined an MPLS architecture for utilizing label switching for internetworking. MPLS is considered to be "multi-protocol" because it can be used with any network layer protocol, and is not limited to IP. An MPLS framework is described in an IETF Internet Draft document entitled A FRAMEWORK FOR MULTIPROTOCOL LABEL SWITCHING, which is referenced as draft-ietf-mpls-framework-02.txt (November 1997), and is hereby incorporated by reference in its entirety. The MPLS architecture is described in an IETF Internet Draft document entitled MULTIPROTOCOL LABEL SWITCHING ARCHITECTURE, which is referenced as draft-ietf-mpls-arch-05.txt (April 1999), and is hereby incorporated by reference in its entirety.

In order to use label switching for internetworking, each label switching device must learn the labels that are used by its neighboring label switching device(s). Therefore, the IETF MPLS working group has defined a Label Distribution Protocol (LDP) for distributing labels between neighboring label switching devices. LDP is described in an IETF Internet Draft document entitled LDP SPECIFICATION, which is referenced as draft-ietf-mpls-ldp-04.txt (May 1999), and is hereby incorporated by reference in its entirety.

Each label switching device maintains a label information base (LIB) for mapping each FEC to a corresponding label. When the label switching device receives a packet including a label, the label switching device utilizes the LIB to map the received label to a next hop FEC and to retrieve a label for the next hop FEC. The label switching device then replaces the label in the packet with the label for the next hop FEC, and forwards the resulting packet to the corresponding outgoing path (or set of paths).

In certain situations, it is desirable to use label switching for routing packets across multiple autonomous systems. Two neighboring autonomous systems share a common border device such that, with respect to a particular routing path, the shared border device is the egress point for one AS and the ingress point for the other AS. For convenience, the AS from which the shared border device receives the packet is referred to as the "incoming" AS, while the AS to which the shared border device forwards the packet is referred to as the "outgoing" AS.

In order to use label switching across autonomous systems, a two-tiered labeling scheme is employed. The ingress point border device in each AS establishes an LSP to the corresponding egress point border device within the AS. Whenever an ingress point border device forwards a packet, the ingress point border device inserts two labels (referred to hereinafter as a "label stack") into the packet, specifically within a packet header. One label (referred to hereinafter as a "border label") is a label associated with the egress point border device within the AS, which the egress point border device provides to the ingress point border device along with "reachability" information using a modified Border Gateway Protocol (BGP). The other label (referred to hereinafter as an "interior label") is a label associated with the next hop FEC for the packet, as described above. The location of the interior label within the packet header is the same whether or not the packet header includes a border label, and therefore intermediate devices process the packet in the same manner whether or not the packet header includes a border label. Within a particular AS, each interior (non-border) device processes the packet based upon the interior label, and replaces the interior label in the packet with a new interior label corresponding to the next hop FEC for the packet, as described above. The egress point border device removes the border label and the interior label from the packet. If the egress point border device is also an ingress point for a neighboring AS, then the ingress point border device inserts a new border label and a new interior label into the packet. The new border label is a label associated with an egress point border device within the neighboring AS, and the interior label is a label associated with the next hop FEC for the packet.

Although the two-tier mechanism allows label switching to be used for routing packets across multiple autonomous systems, the two-tier mechanism has a number of disadvantages. One disadvantage is that the two-tier mechanism requires that BGP be modified or extended to distribute labels. Another disadvantage is that the label stack adds a substantial amount of overhead per packet.

Thus, a mechanism for using label switching across autonomous systems that does not utilize a label stack and does not require any modifications to BGP would be valuable.

SUMMARY OF THE INVENTION

In accordance with one aspect of the invention, a label switched path is established across multiple autonomous systems by establishing a label switched path in each autonomous system, and, at each shared border device, linking an incoming label switched path in an incoming autonomous system to an outgoing label switched path in an outgoing autonomous system. The Label Distribution Protocol is preferably used to establish the label switched path between border devices in each autonomous system. Each border device maps a label associated with the incoming label switched path to a label associated with the outgoing label switched path. When a border device receives a protocol message including the label associated with the incoming label switched device, the border device replaces the label in the protocol message with the label associated with the outgoing label switched path, and forwards the protocol message to the downstream neighboring (next hop) device in the outgoing autonomous system.

By using the Label Distribution Protocol to establish the label switched path within each autonomous system, a label switched path is established across multiple autonomous systems without requiring any modifications to BGP for carrying label information. Also, by having each border device "link" an incoming label switched path from an incoming autonomous system to an outgoing label switched path in an outgoing autonomous system, label switching requires only a single label in each packet rather than a label stack, as in prior art embodiments.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

As discussed above, a mechanism for using label switching across autonomous systems that does not utilize a label stack and does not require any modifications to BGP would be valuable. The present invention provides such a mechanism by using an LDP mechanism to establish the LSP from the ingress point border device to the egress point border device for each AS, and using a single label (rather than a label stack) in each packet in order to perform the label switching. The LDP mechanism provides the shared border device with the label associated with the last hop FEC in the incoming AS as well as the label associated with the first hop FEC in the outgoing AS. The shared border device maintains an LIB entry that maps the label associated with the last hop FEC in the incoming AS to the first hop FEC in the outgoing AS. When the shared border device receives a packet including the label associated with the last hop FEC in the incoming AS, the shared border device utilizes the LIB to obtain the label associated with the first hop FEC in the outgoing AS, and replaces the label in the packet with the label associated with the first hop FEC in the outgoing AS.

Figure 1:
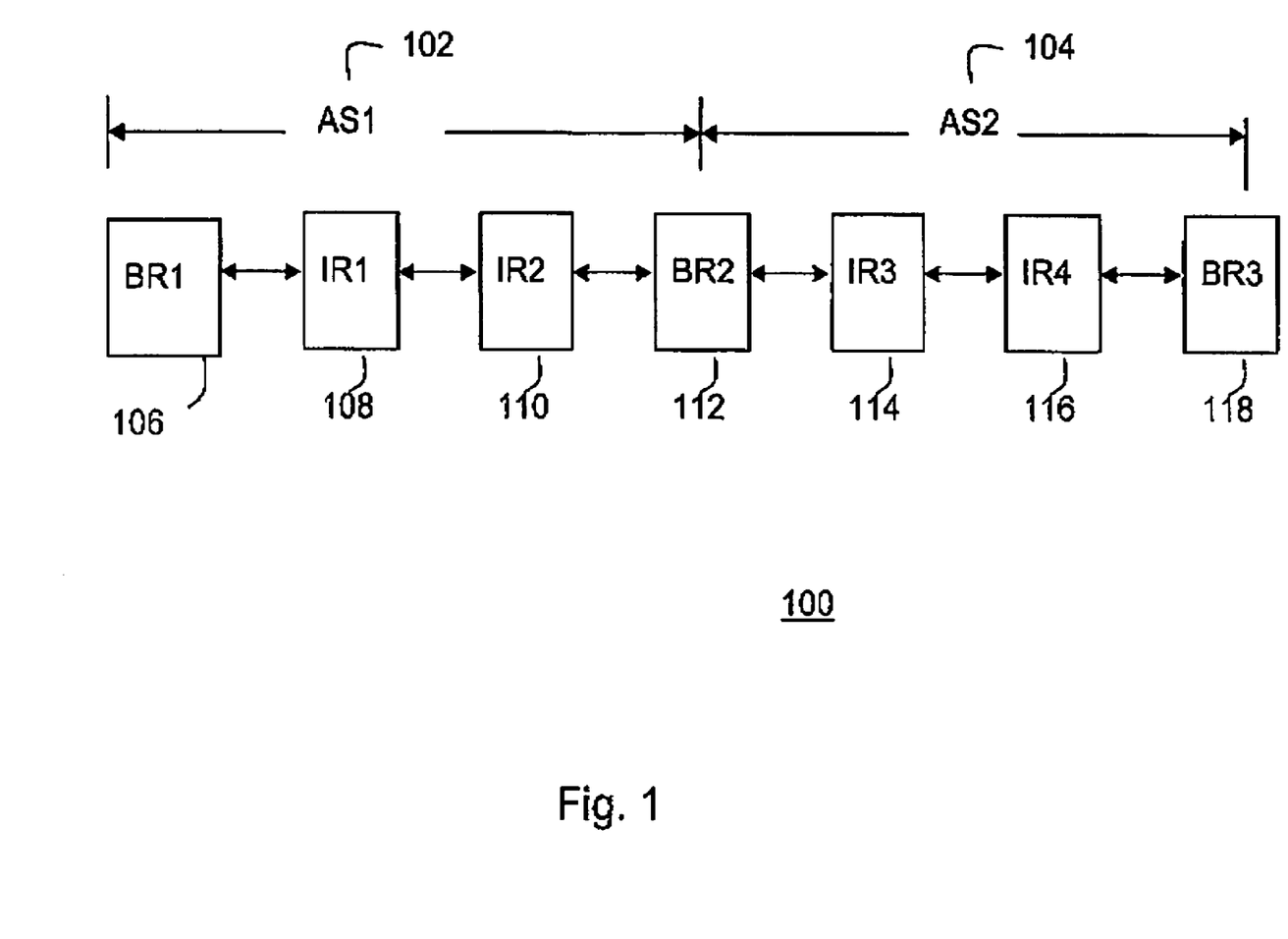
FIG. 1 is a block diagram showing an exemplary communication system including two autonomous systems in accordance with an embodiment of the present invention.

FIG. 1 shows an exemplary communication system 100 including two autonomous systems, which are labeled AS1 (102) and AS2 (104). The autonomous system AS1 (102) includes the border router BR1 (106), the interior routers IR1 (108) and IR2 (110), and the border router BR2 (112). The autonomous system AS2 (104) includes the border router BR2 (112), the interior routers IR3 (114) and IR4 (116), and the border router BR3 (118). The border router BR2 (112) is the shared border router between the autonomous system AS1 (102) and the autonomous system AS2 (104). The border routers BR1 (106), BR2 (112), and BR3 (118) run both BGP and an interior gateway protocol (IGP), such as OSPF, RIP, or Hello, while the interior routers IR1 (108), IR2 (110), IR3 (114); and IR4 (116) run only an IGP.

Figure 2:
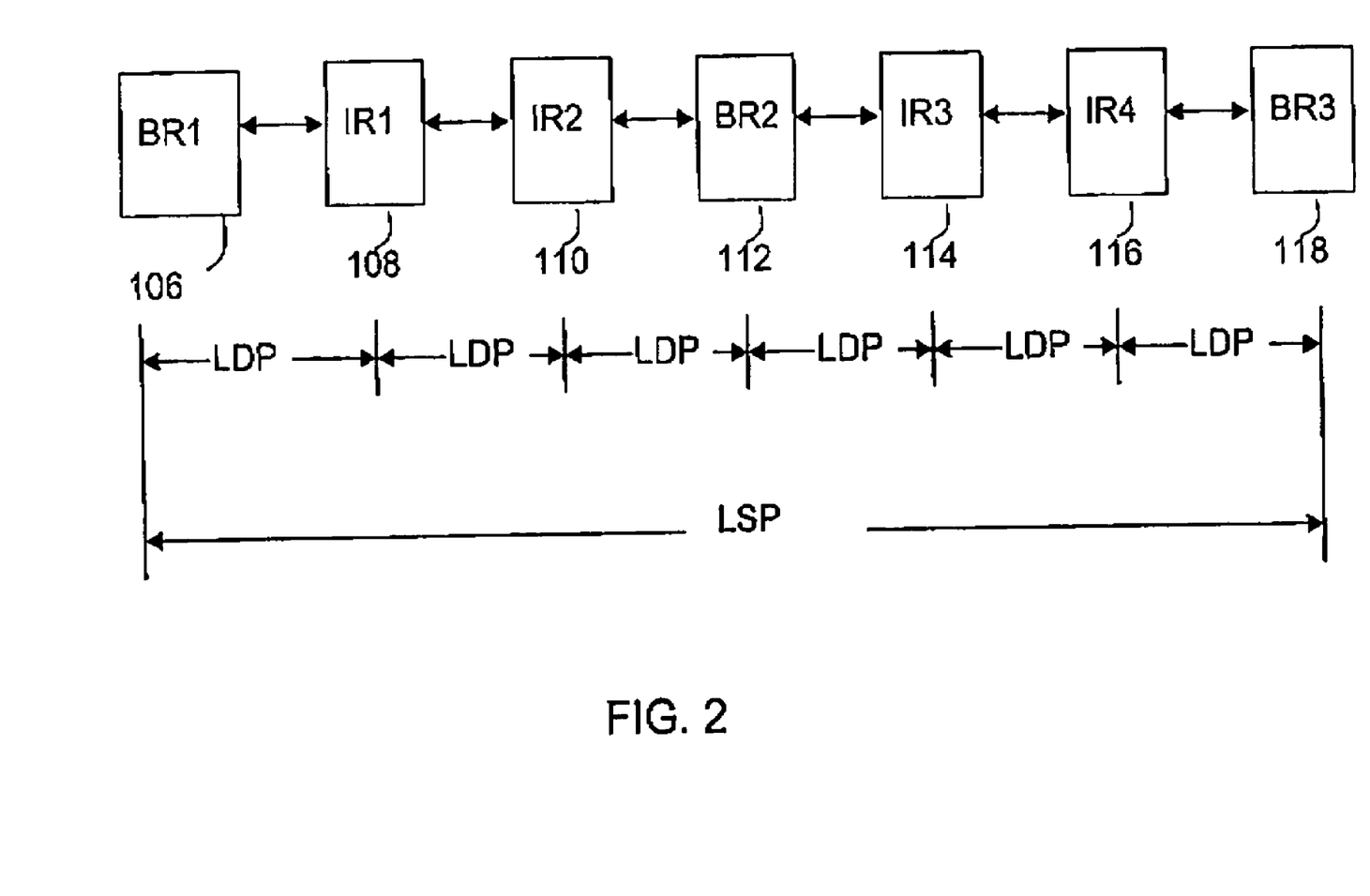
FIG. 2 is a block diagram showing an exemplary label switched path across two autonomous systems and Label Distribution Protocol sessions between neighboring routers in accordance with an embodiment of the present invention.

In accordance with an embodiment of the present invention, a LSP is established across multiple autonomous systems. For example, as shown in FIG. 2, a LSP may be established from the border router BR1 (106) to the border router BR3 (118) across the autonomous systems AS1 (102) and AS2 (104). Each router, namely BR1 (106), IR1 (108), IR2 (110), BR2 (112), IR3 (114), IR4 (116), and BR3 (118), support LDP such that each router is capable of establishing a LDP session with its immediate neighboring router. Specifically, the router BR1 (106) is capable of establishing a LDP session with the router IR1 (108), the router IR1 (108) is capable of establishing a LDP session with the router IR2 (110), the router IR2 (110) is capable of establishing a LDP session with the router BR2 (112), the router BR2 (112) is capable of establishing a LDP session with the router IR3 (114), the router IR3 (114) is capable of establishing a LDP session with the router IR4 (116), and the router IR4 (116) is capable of establishing a LDP session with the router BR3 (118).

In a typical prior art embodiment, in order to establish a LDP across multiple autonomous systems, each router has to "learn" the interior label associated with its downstream neighboring router (i.e., the next hop router for the LDP), and each border router has to additionally "learn" the border label associated with its downstream neighboring border router. Each router obtains the interior label associated with its downstream neighboring router using LDP. Each border router obtains the border label associated with its downstream neighboring border router along with "reachability" information using a modified BGP.

Figure 3:
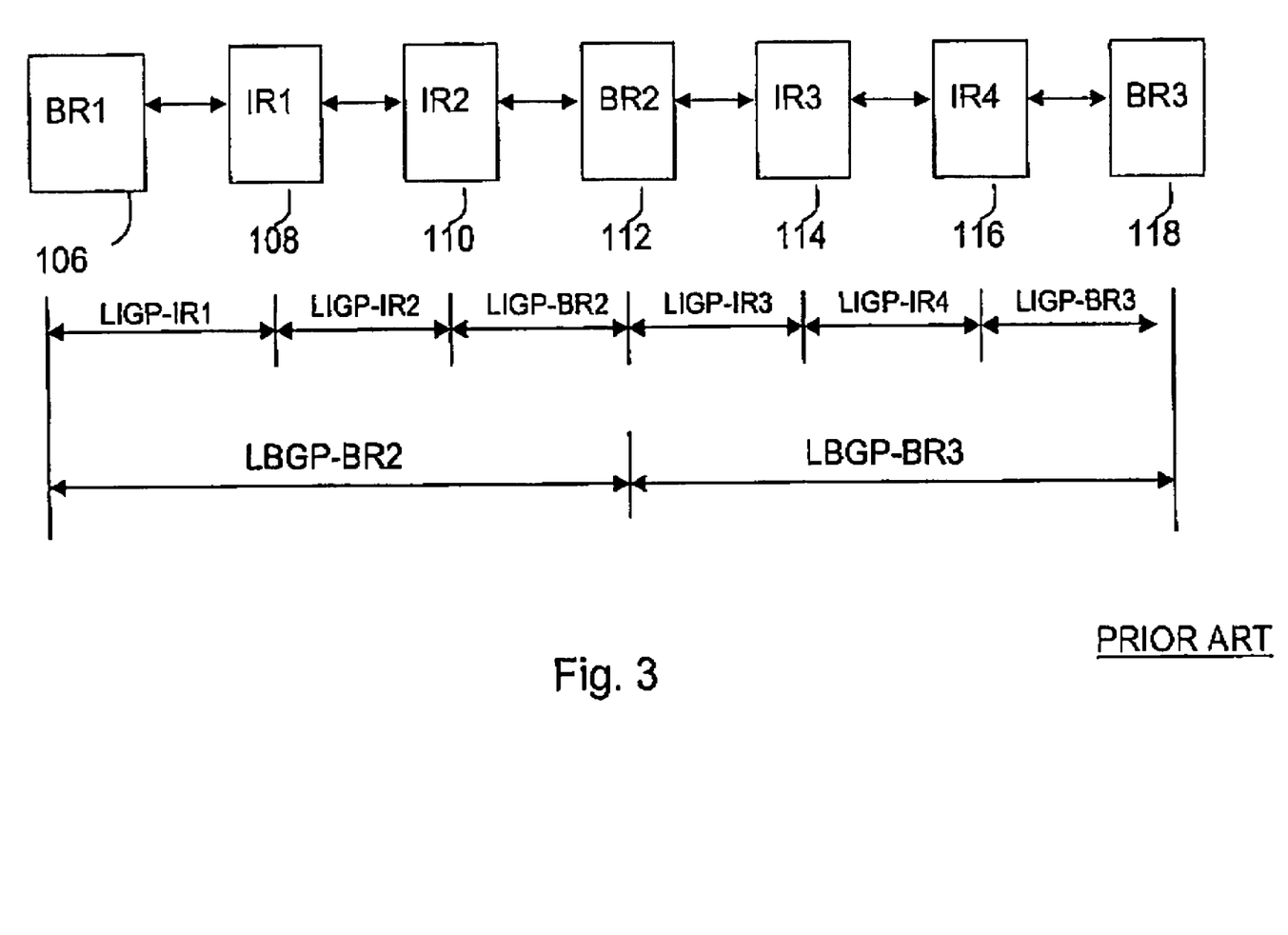
FIG. 3 is a block diagram showing an exemplary label distribution scheme as known in the art.

For example, as shown in FIG. 3, in order to establish the LSP from the border router BR1 (106) to the border router BR3 (118) across the autonomous systems AS1 (102) and AS2 (104), each router has to "learn" the interior label associated with its downstream neighboring router (i.e., the next hop router for the LDP), and each border router has to additionally "learn" the border label associated with its downstream neighboring border router. For convenience, an interior label associated with a particular router is designated by "LIGP" followed by the router name (for example, LIGP-IR1), and a border label associated with a particular border router is designated by "LBGP" followed by the border router name (for example, LBGP-BR2). Each router obtains the interior label associated with its downstream neighboring router using LDP. Thus, as shown in FIG. 3, the router BR1 (106) "learns" the interior label LIGP-IR1 from the router IR1 (108) using LDP, the router IR1 (108) "learns" the interior label LIGP-IR2 from the router IR2 (110) using LDP, the router IR2 (110) "learns" the interior label LIGP-BR2 from the router BR2 (112) using LDP, the router BR2 (112) "learns" the interior label LIGP-IR3 from the router IR3 (114) using LDP, the router IR3 (114) "learns" the interior label LIGP-IR4 from the router IR4 (116) using LDP, and the router IR4 (116) "learns" the interior label LIGP-BR3 from the router BR3 (118) using LDP. Each border router obtains the border label associated with its downstream neighboring border router along with "reachability" information using a modified BGP. Thus, as shown in FIG. 3, the border router BR1 (106) "learns" the border label LBGP-BR2 from the border router BR2 (112) via the modified BGP, and the border router BR2 (112) "learns" the border label LBGP-BR3 from the border router BR3 (118) via the modified BGP.

Once each router has "learned" the interior label associated with its downstream neighboring router and each border router has additionally "learned" the border label associated with its downstream neighboring border router, a packet can be sent over the LSP. Specifically, whenever an ingress point border router forwards a packet, the ingress point border router inserts a label stack including an interior label followed by a border label into the packet, specifically within a packet header. Within a particular AS, each interior (non-border) device processes the packet based upon the interior label, and replaces the interior label in the packet with a new interior label corresponding to the next hop FEC for the packet, as described above. The egress point border device removes the label stack from the packet. If the egress point border device is also an ingress point for a neighboring AS, then the ingress point border device inserts a new label stack into the packet.

Figure 4:
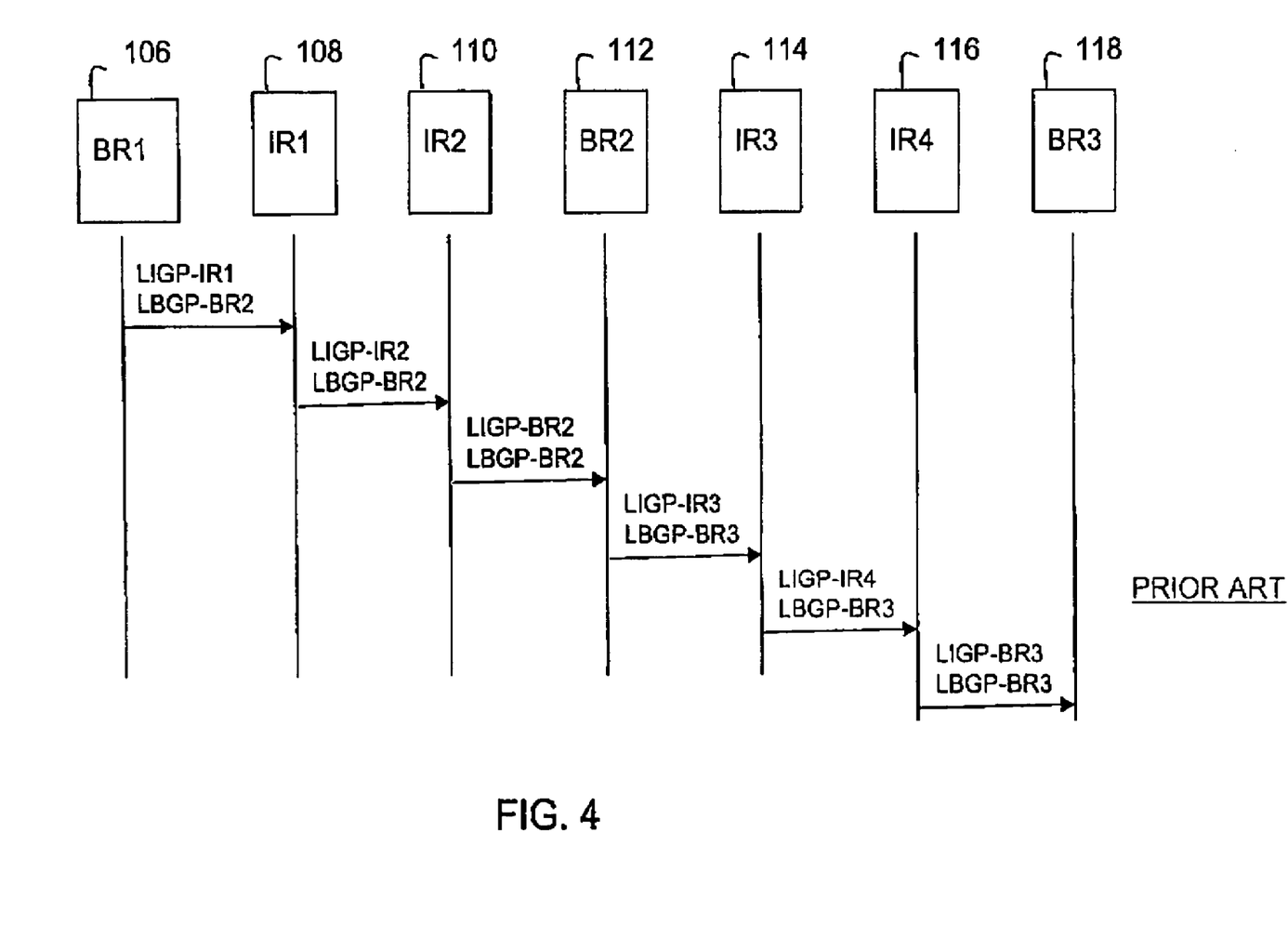
FIG. 4 is a block diagram showing an exemplary label switched packet forwarding scheme using label stacks as known in the art.

For example, as shown in FIG. 4, when the border router BR1 (106) wants to send a packet to the border router BR3 (118) over the LSP, the border router BR1 (106) inserts a label stack into the packet. For convenience, the border label is shown on the bottom of the label stack, while the interior label is shown at the top of the label stack. The label stack inserted by the border router BR1 (106) includes the border label LBGP-BR2 and the interior label LISP-IR1. After inserting the label stack into the packet, the border router BR1 (106) forwards the packet on to the router IR1 (108).

The router IR1 (108) replaces the interior label LIGP-IR1 with the interior label LIGP-IR2, and forwards the packet on to the router IR2 (110). The router IR2 (110) replaces the interior label LIGP-IR2 with the interior label LIGP-BR2, and forwards the packet on to the router BR2 (112). Because the border router BR2 (112) is the egress point border router for the autonomous system AS1 (102) as well as the ingress point border router for the autonomous system AS2 (104), the border router BR2 (112) replaces the label stack in the packet with a label stack including the border label LBGP-BR3 and the interior label LIGP-IR3, and forwards the packet on to the router IR3 (114).

The router IR3 (114) replaces the interior label LIGP-IR3 with the interior label LIGP-IR4, and forwards the packet on to the router IR4 (116). The router IR4 (116) replaces the interior label LIGP-IR4 with the interior label LIGP-BR3, and forwards the packet on to the router BR3 (118). Because the border router BR3 (118) is the egress point border router for the autonomous system AS2 (104), the border router BR3 (118) removes the label stack from the packet, and forwards the packet according to the network layer address.

In a preferred embodiment of the present invention, label switching is performed across multiple autonomous systems without using a two-tiered label stack and without requiring a modified BGP for distributing labels between border routers. Specifically, a preferred embodiment of the present invention provides performs label switching across multiple autonomous systems by using an LDP mechanism to establish the LSP from the ingress point border device to the egress point border device for each AS, and using a single label (rather than a label stack) in each packet in order to perform the label switching. The LDP mechanism provides the shared border device with the label associated with the last hop FEC in the incoming AS as well as the label associated with the first hop FEC in the outgoing AS. The shared border device maintains an LIB entry that maps the label associated with the last hop FEC in the incoming AS to the first hop FEC in the outgoing AS. When the shared border device receives a packet including the label associated with the last hop FEC in the incoming AS, the shared border device utilizes the LIB to obtain the label associated with the first hop FEC in the outgoing AS, and replaces the label in the packet with the label associated with the first hop FEC in the outgoing AS.

Figure 5:
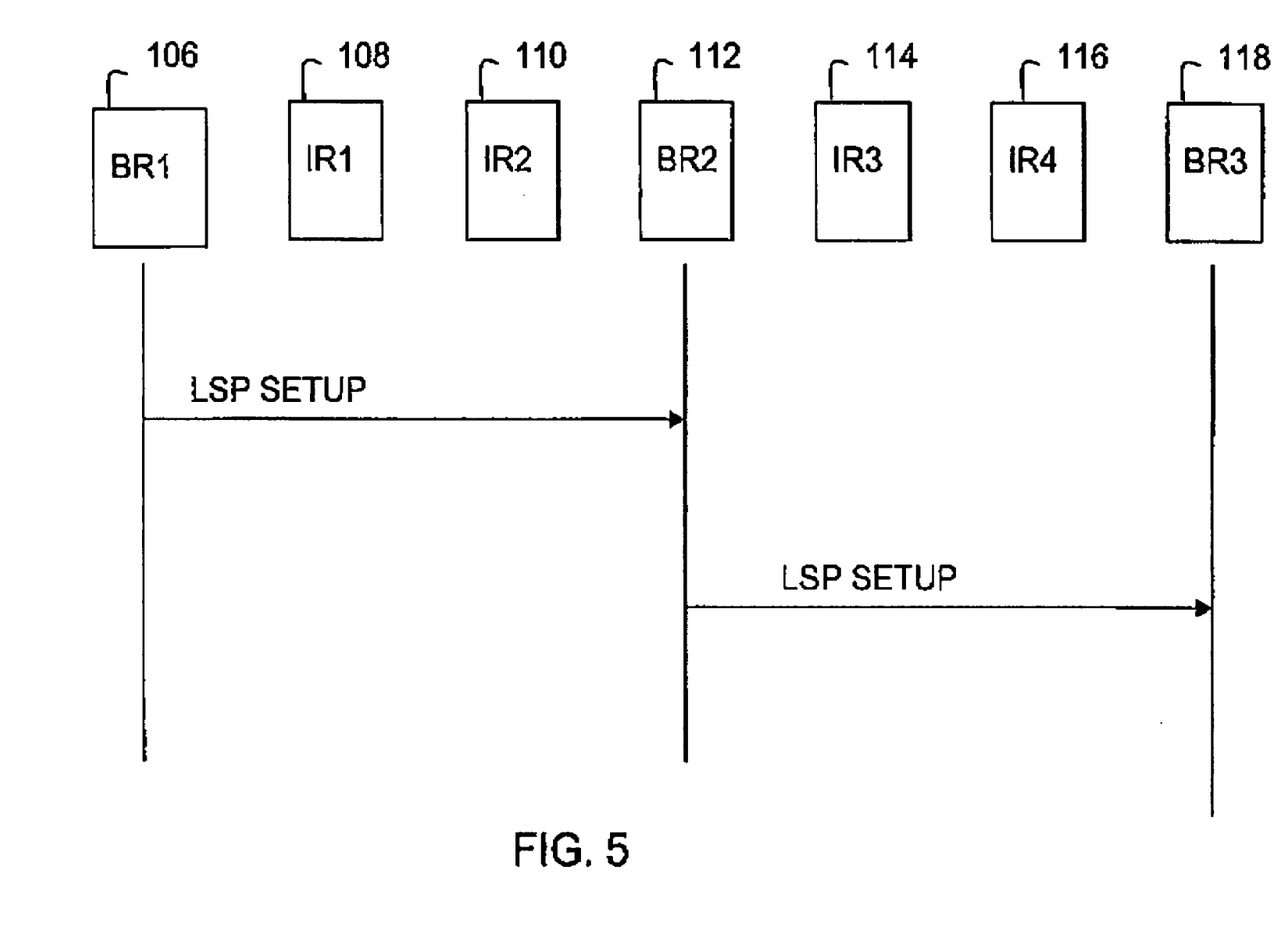
FIG. 5 is a block diagram showing exemplary label switched paths established across each of two autonomous systems in accordance with an embodiment of the present invention.

As shown in FIG. 5, when the border router BR1 (106) wants to establish the LSP to the border router BR3 (118), the border router BR1 (106) establishes a LSP to the border router BR2 (112), the border router BR2 (112) establishes a LSP to the border router BR3 (118), and the border router BR2 (112) maps the LSP from the border router BR1 (106) to the LSP to the border router BR3 (118). Specifically, the border router BR1 (106) consults its routing table and determines therefrom that the border router BR2 (112) is the downstream neighboring border router. The border router BR1 (106) then initiates a LSP setup to the border router BR2 (112) using LDP. Upon receiving the LSP setup from the border router BR1 (106) in the incoming AS (102), the border router BR2 (112) determines that the FEC terminates at the border router BR3 (118) in the outgoing AS (104) (i.e., the border router BR2 determines that it is a shared border device), establishes a LSP to the border router BR3 (118) in the outgoing AS (104), and creates a LIB entry mapping the LSP from the incoming AS (102) to the LSP in the outgoing AS (104). Specifically, upon receiving the LSP setup from the border router BR1 (106), the border router BR2 (112) consults its routing table and determines therefrom that the border router BR3 (118) is the downstream neighboring border router. The border router BR2 (112) then initiates a LSP setup to the border router BR3 (118) using LDP. Upon receiving the LSP setup from the border router BR2 (112), the border router BR3 (118) determines that it is the termination point for the FEC, and therefore does not generate a LSP setup in another AS.

Figure 6:
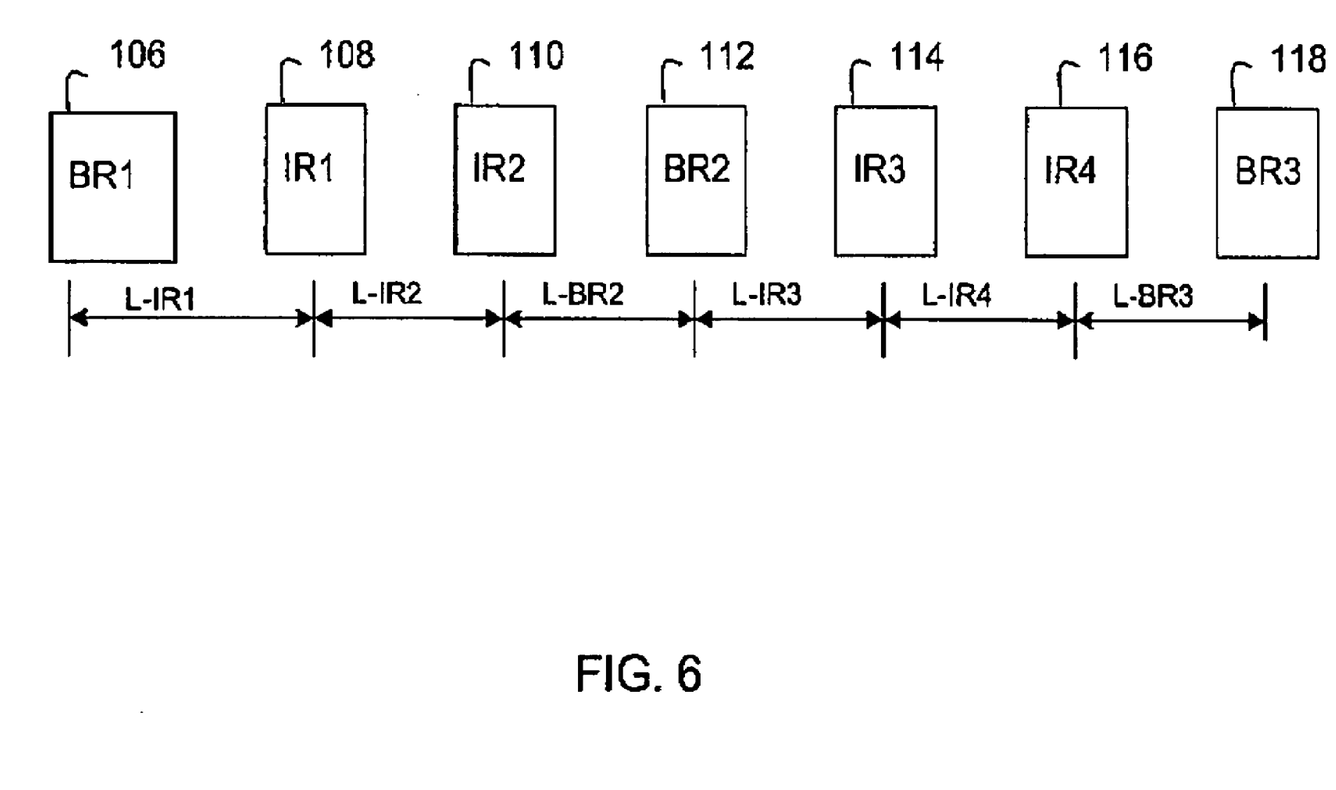
FIG. 6 is a block diagram showing an exemplary label distribution scheme in accordance with an embodiment of the present invention.

Thus, as shown in FIG. 6, the router BR1 (106) "learns" the label L-IR1 from the router IR1 (108) using LDP, the router IR1 (108) "learns" the label L-IR2 from the router IR2 (110) using LDP, the router IR2 (110) "learns" the label L-BR2 from the router BR2 (112) using LDP, the router BR2 (112) "learns" the label L-IR3 from the router IR3 (114) using LDP, the router IR3 (114) "learns" the label L-IR4 from the router IR4 (116) using LDP, and the router IR4 (116) "learns" the label L-BR3 from the router BR3 (118) using LDP. The border router BR2 (112) creates a LIB entry that maps the label associated with the last hop FEC in the incoming AS (102), which is the label associated with the border router BR2 (112), to the label associated with the first hop FEC in the outgoing AS (104), which is the label associated with the interior router IR3 (114).

Once each router has "learned" the label associated with its downstream neighboring router and the shared border router has created a LIB entry that maps the label associated with the last hop FEC in the incoming AS to the label associated with the first hop FEC in the outgoing AS, a packet can be sent over the LSP. Specifically, the ingress point border router inserts a label into the packet, specifically within a packet header. Each interior (non-border) router replaces the label in the packet with a new label corresponding to the next hop FEC for the packet, and forwards the packet to the next hop router. A shared border router replaces the label in the packet with a new label corresponding to the next hop FEC for the packet, and forwards the packet to the next hop router. The egress point border router removes the label from the packet, and forwards the packet based upon the network layer address of the packet.

Figure 7:
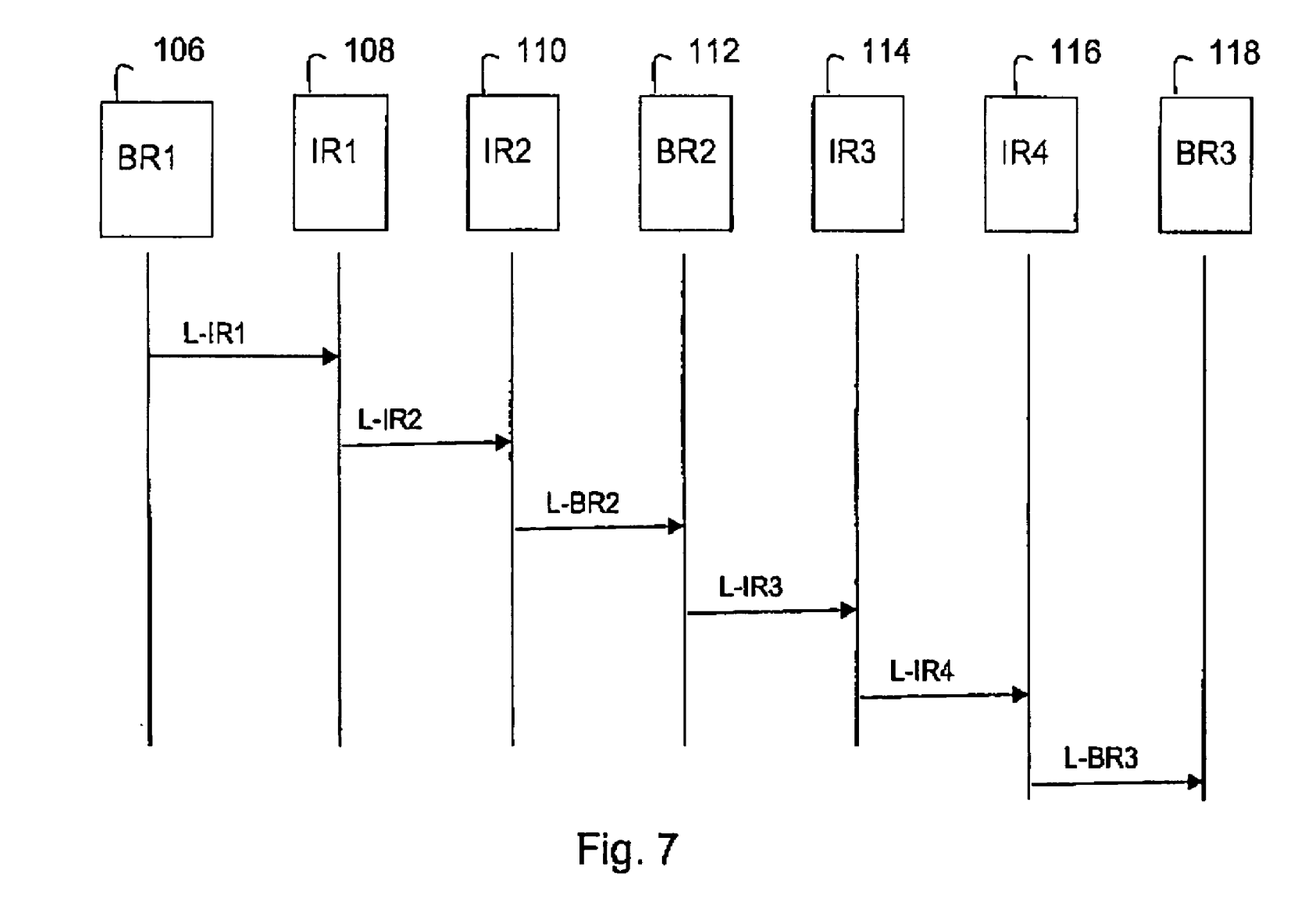
FIG. 7 is a block diagram showing an exemplary label switched packet forwarding scheme in accordance with an embodiment of the present invention.

For example, as shown in FIG. 7, when the border router BR1 (106) wants to send a packet to the border router BR3 (118) over the LSP, the border router BR1 (106) inserts the label L-IR1 into the packet, and forwards the packet on to the router IR1 (108). The router IR1 (108) replaces the label L-IR1 with the label L-IR2, and forwards the packet on to the router IR2 (110). The router IR2 (110) replaces the label L-IR2 with the label L-BR2, and forwards the packet on to the router BR2 (112). The border router BR2 (112) replaces the label L-BR2 with the label L-IR3, and forwards the packet on to the router IR3 (114). The router IR3 (114) replaces the label L-IR3 with the label L-IR4, and forwards the packet on to the router IR4 (116). The router IR4 (116) replaces the label L-IR4 with the label L-BR3, and forwards the packet on to the router BR3 (118). Because the border router BR3 (118) is the egress point border router for the autonomous system AS2 (104), the border router BR3 (118) removes the label from the packet, and forwards the packet according to the network layer address.

Thus, the various border routers in the communication system cooperate to establish a LSP across multiple autonomous systems by "linking" together a number of AS-specific LSPs. Specifically, each border router establishes a LSP to its downstream neighboring border router. Each shared border router "links" the LSP from its incoming AS (referred to hereinafter as the "incoming LSP") to the LSP for its outgoing AS (referred to hereinafter as the "outgoing LSP") by mapping a label associated with the incoming LSP, which is a label associated with the border router itself, to a label associated with the outgoing LSP, which is equal to a label associated with the downstream neighboring (next hop) router in the outgoing LSP. Upon receiving a packet, the ingress point border router inserts into the packet a label associated with its downstream neighboring (next hop) router, and forwards the packet to its downstream neighboring (next hop) router. Each shared border router replaces the label in the packet with a new label equal to the label associated with its downstream neighboring (next hop) router according to the mapping maintained by the shared border router. The egress point border router removes the label from the packet.

Figure 8:
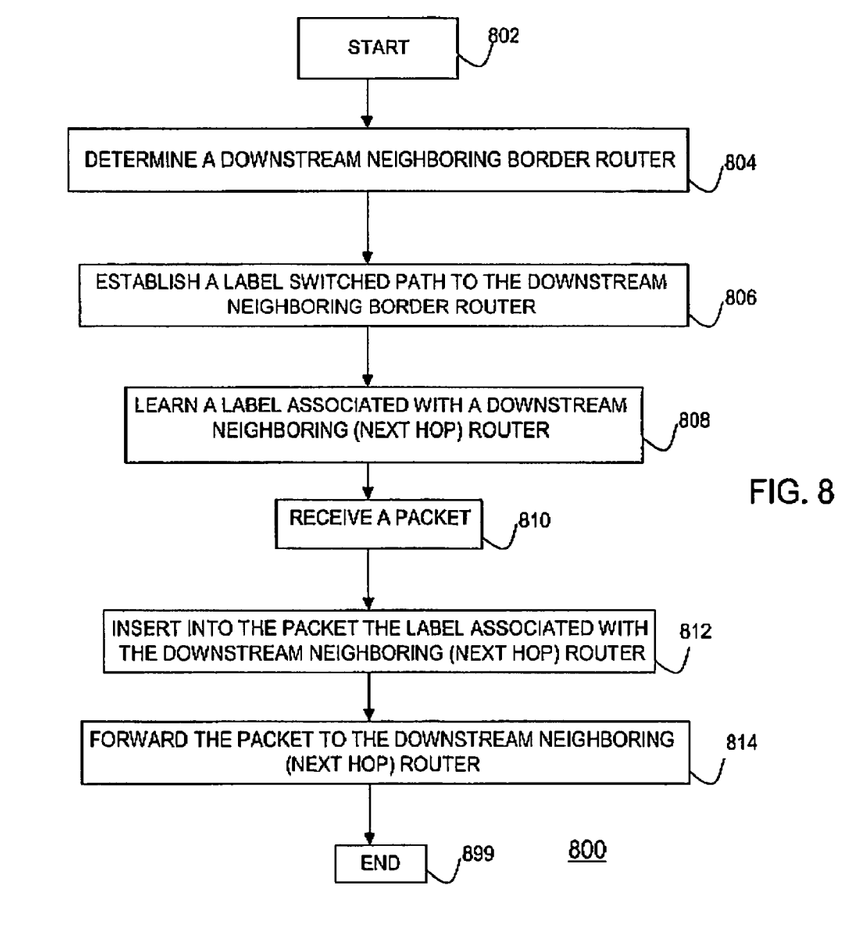
FIG. 8 is a logic flow diagram showing exemplary ingress point border router logic for establishing a LSP across multiple autonomous systems and forwarding a packet across the LSP in accordance with an embodiment of the present invention.

FIG. 8 is a logic flow diagram showing exemplary ingress point border router logic 800 for establishing a LSP across multiple autonomous systems and forwarding a packet across the LSP. Starting in step 802, the logic first determines a downstream neighboring border router, in step 804, and establishes a LSP to the downstream neighboring border router, in step 806. The logic then "learns" a label associated with its downstream neighboring (next hop) router, in step 808, specifically via a LDP session with the downstream neighboring (next hop) router. Upon receiving a packet, in step 810, the logic inserts into the packet the label associated with the downstream neighboring (next hop) router, in step 812, and forwards the packet to the downstream neighboring (next hop) router, in step 814. The logic terminates in step 899.

Figure 9:
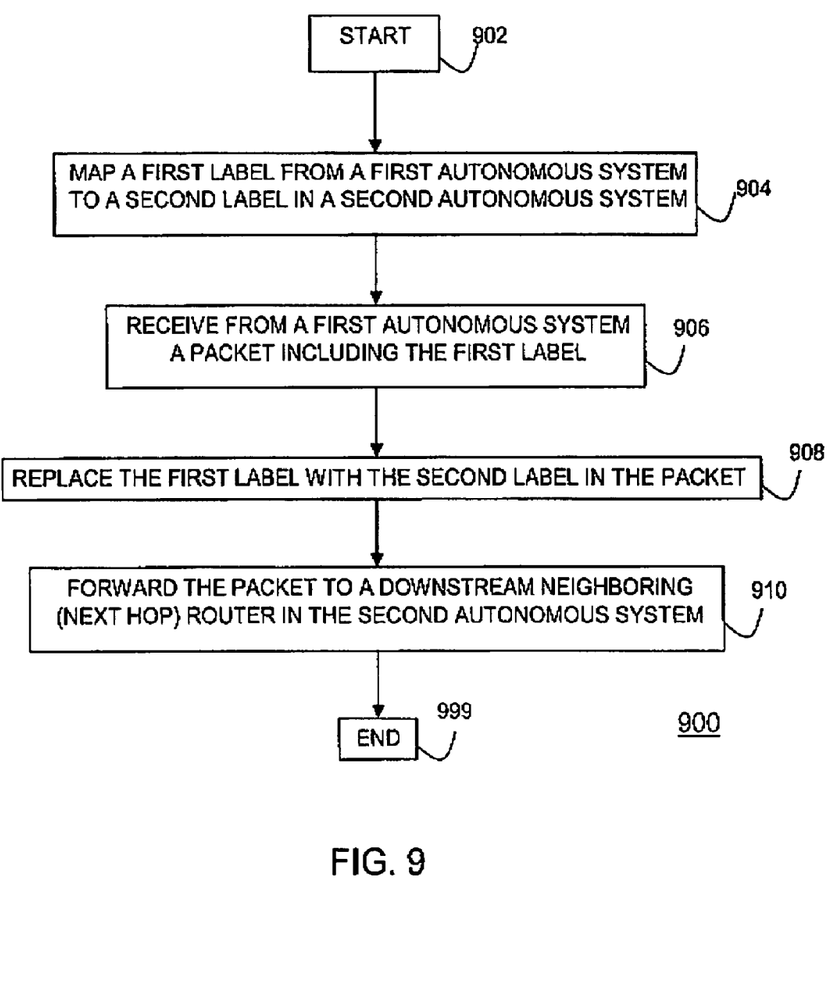
FIG. 9 is a logic flow diagram showing exemplary shared border router logic for establishing a LSP across multiple autonomous systems and forwarding a packet across the LSP in accordance with an embodiment of the present invention.

FIG. 9 is a logic flow diagram showing exemplary shared border router logic 900 for establishing a LSP across multiple autonomous systems and forwarding a packet across the LSP. Starting in step 902, the logic maps a first label from a first autonomous system to a second label in a second autonomous system, in step 904. Then, upon receiving from the first autonomous system a packet including the first label, in step 906, the logic replaces the first label with the second label in the packet, in step 908, and forwards the packet to a downstream neighboring (next hop) router in the second autonomous system, in step 910. The logic terminates in step 999.

Figure 10:
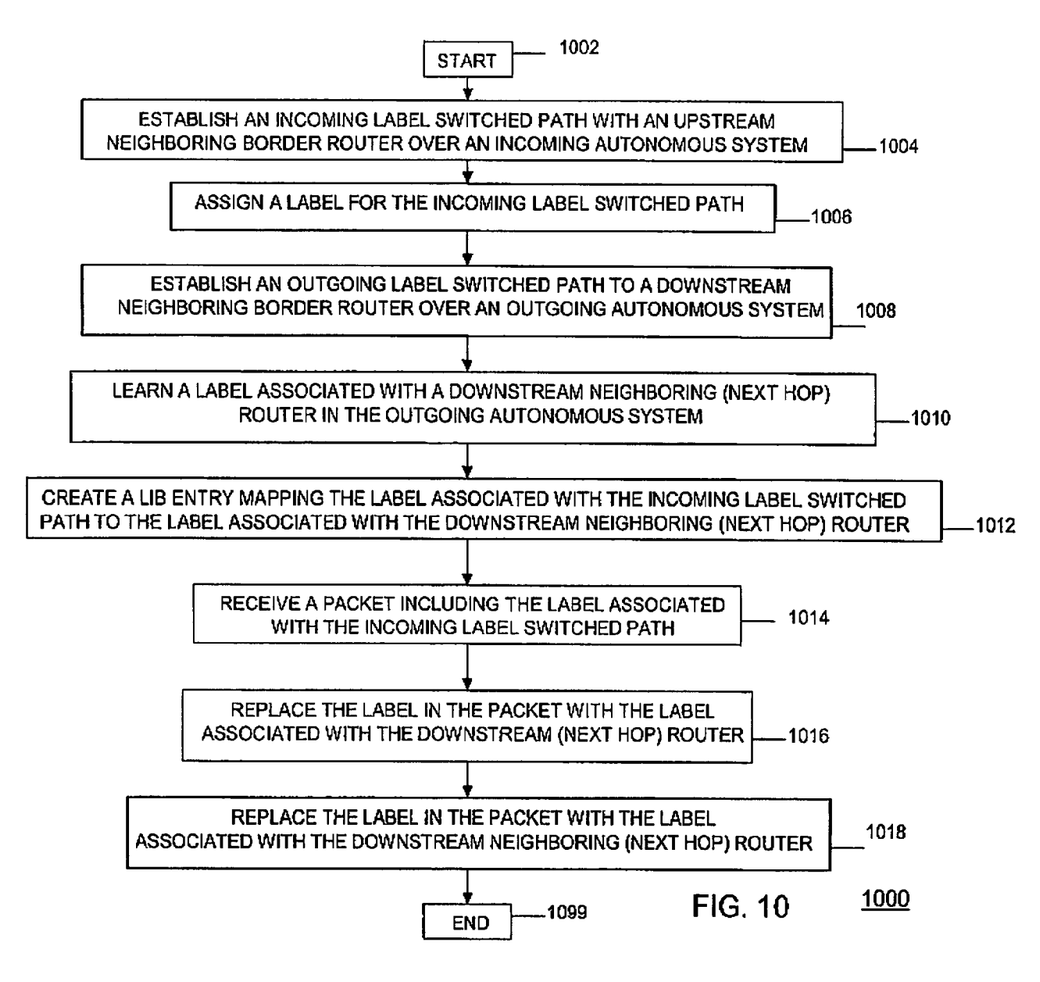
FIG. 10 is a logic flow diagram showing exemplary shared border router logic for establishing a LSP across multiple autonomous systems and forwarding a packet across the LSP in accordance with an embodiment of the present invention.

FIG. 10 shows more detailed exemplary shared border router logic 1000. Starting in step 1002, the logic first establishes an incoming LSP with its upstream neighboring border router over the incoming AS, in step 1004, specifically as part of the LSP setup procedure initiated by the upstream neighboring border router. The logic assigns a label for the incoming LSP, in step 1006, which it sends to the upstream neighboring (last hop) router via an LDP session. The logic also establishes an outgoing LSP to its downstream neighboring border router over the outgoing AS, in step 1008. The logic "learns" the label associated with its downstream neighboring (next hop) router in the outgoing AS, in step 1010, specifically via an LDP session. The logic creates a LIB entry mapping the label associated with the incoming LSP to the label associated with the downstream neighboring (next hop) router, in step 1012. Upon receiving a packet including the label associated with the incoming LSP, in step 1014, the logic replaces the label in the packet with the label associated with the downstream neighboring (next hop) router, in step 1016, and forwards the packet to the downstream neighboring (next hop) router, in step 1018. The logic terminates in step 1099.

In a preferred embodiment of the present invention, predominantly all of the logic 800, 900, and 1000 for establishing LSPs across multiple autonomous systems is implemented as a set of computer program instructions that are stored in a computer readable medium and executed by an embedded microprocessor system within the router. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

It should be noted that the term "packet" is used herein generically to describe various protocol messages that are processed by a communication device, and should not be construed to limit application of the present invention to a specific protocol message format or communication protocol. Thus, a "packet" may be any protocol message including, but not limited to, a frame, a packet, a datagram, a user datagram, or a cell.

It should also be noted that the terms "router" and "switch" are used herein generically to describe any of a variety of devices that implement the described protocols and procedures for establishing LSPs across multiple autonomous systems, and should not be construed to limit application of the present invention to any specific type of device.

It should further be noted that, although the present invention utilizes the IETF Label Distribution Protocol (LDP) for distributing labels between various label switching devices, the mechanisms described herein can be applied more generally to other protocols, including, but not limited to, various embodiments of the IETF LDP as currently defined or hereinafter revised. The present invention is in no way limited to the IETF LDP.

Thus, the present invention may be embodied as a method for establishing a label switched path across multiple autonomous systems involving mapping a first label from a first autonomous system to a second label in a second autonomous system, receiving from the first autonomous system a protocol message including the first label, replacing the first label with the second label in the protocol message, and forwarding the protocol message to a downstream neighboring (next hop) device in the second autonomous system.

The present invention may also be embodied as a device for establishing a label switched path across multiple autonomous systems including mapping logic for mapping a first label from a first autonomous system to a second label in a second autonomous system, receiving logic for receiving from the first autonomous system a protocol message including the first label, replacing logic for replacing the first label with the second label in the protocol message, and forwarding logic for forwarding the protocol message to a downstream neighboring (next hop) device in the second autonomous system.

The present invention may also be embodied as a program product comprising a computer readable medium having embodied therein a computer program for establishing a label switched path across multiple autonomous systems, where the computer program includes mapping logic for mapping a first label from a first autonomous system to a second label in a second autonomous system, receiving logic for receiving from the first autonomous system a protocol message including the first label, replacing logic for replacing the first label with the second label in the protocol message, and forwarding logic for forwarding the protocol message to a downstream neighboring (next hop) device in the second autonomous system.

The present invention may also be embodied as a communication system including a plurality of autonomous systems, where each autonomous system has at least a border device that is shared with another autonomous system, and where the shared border device includes at least mapping logic for mapping a first label from a first autonomous system to a second label in a second autonomous system, receiving logic for receiving from the first autonomous system a protocol message including the first label, replacing logic for replacing the first label with the second label in the protocol message, and forwarding logic for forwarding the protocol message to a downstream neighboring (next hop) device in the second autonomous system.

The present invention may be embodied in other specific forms without departing from the essence or essential characteristics. The described embodiments are to be considered in all respects only as illustrative and not restrictive.

We claim:

1. A method for establishing a label switched path across multiple autonomous systems without the use of a multi-label stack, wherein each one of the multiple autonomous systems includes at least one border router and a plurality of interior routers, the method comprising:

storing, in a memory at a border router coupling a first autonomous system to a second autonomous system, a mapping of a first label associated with a last hop forwarding equivalency class (FEC) of the first autonomous system to a second label associated with a first hop in the second autonomous system, the second label associated with the last hop FEC of the first autonomous system;

receiving from an interior router in said first autonomous system a protocol message including a single label stack comprised of said first label;

replacing said first label in the single label stack with said second label in said protocol message; and forwarding said single label stack protocol message to a downstream neighboring (next hop) interior router in said second autonomous system.

2. The method of claim 1, comprising:

establishing an incoming label switched path over said first autonomous system;

associating said first label with said incoming label switched path;

establishing an outgoing label switched path over said second autonomous system;

learning said second label associated with said downstream neighboring (next hop) interior router in said second autonomous system.

3. The method of claim 2, wherein establishing said outgoing label switched path over said second autonomous system comprises:

using a Label Distribution Protocol to set up said outgoing label switched path to a downstream neighboring border device.

4. The method of claim 2, wherein learning said second label associated with said downstream neighboring (next hop) interior router in said second autonomous system comprises:

establishing a Label Distribution Protocol session with said downstream neighboring (next hop) interior router; and receiving said second label associated with said downstream neighboring (next hop) interior router in said second autonomous system via said Label Distribution Protocol session.

5. The method of claim 2, wherein mapping said first label from said first autonomous system to said second label in said second autonomous system comprises:

maintaining a label information base at; and creating in said label information base a label information base entry mapping said first label from said first autonomous system to said second label in said second autonomous system.

6. A border router device for establishing a label switched path across multiple autonomous systems without the use of a multi-label stack, wherein each autonomous system of the multiple autonomous systems includes at least one border router and a plurality of interior routers the device comprising:

mapping logic operably coupled to map a first label associated with a last hop forwarding equivalency class (FEC) of a first autonomous system to a second label associated with a first hop in a second autonomous system, the second label associated with the last hop FEC of the first autonomous system;

receiving logic operably coupled to receive from an interior router in said first autonomous system a protocol message including a single label stack comprising said first label;

replacing logic responsive to the receiving logic and operably coupled to replace said first label in the single label stack with said second label in said protocol message; and forwarding logic responsive to the replacing logic and operably coupled to forward said single label protocol message to a downstream neighboring (next hop) interior router in said second autonomous system.

7. The device of claim 6, comprising:

first label switched path establishing logic operably coupled to establish an incoming label switched path over said first autonomous system and associate said first label with said incoming label switched path;

second label switched path establishing logic responsive to said first label switched path establishing logic and operably coupled to establish an outgoing label switched path over said second autonomous system;

label distribution logic operably coupled to obtain said second label from said downstream neighboring (next hop) interior router in said second autonomous system;

mapping logic operably coupled to map said first label from said interior router of said first autonomous system to said second label in said second autonomous system;

receiving logic operably coupled to receive from said first autonomous system said protocol message including said first label;

replacing logic responsive to said receiving logic and operably coupled to forward said protocol message to said downstream neighboring (next hop) interior router in said second autonomous system.

8. The device of claim 7, wherein said second label switched path establishing logic comprises Label Distribution Protocol logic.

9. The device of claim 7, wherein said label distribution logic comprises Label Distribution Protocol logic operably coupled to establish a Label Distribution Protocol session with said downstream neighboring (next hop) interior router and receive said second label associated with said downstream neighboring (next hop) interior router in said second autonomous system via said Label Distribution Protocol session.

10. The device of claim 7, further comprising a label information base, wherein said mapping logic is operably coupled to create in said label information base a label information base entry mapping said first label from said first autonomous system to said second label in said second autonomous system.

11. A program product for use at a border router comprising a computer readable medium having embodied therein a computer program for establishing a label switched path across multiple autonomous systems without the use of a multi-label stack, wherein each of the multiple autonomous systems comprises at least one border router and a plurality of interior routers, the computer program comprising:

mapping logic programmed to map a first label associated with a last hop forwarding equivalency class (FEC) of a first autonomous system to a second label associated with a first hop in a second autonomous system, the second label associated with the last hop FEC of the first autonomous system;

receiving logic programmed to receive from an interior router of said first autonomous system a protocol message including a single label stack comprising said first label;

replacing logic responsive to the receiving logic and programmed to replace said first label in the single label stack with said second label in said protocol message; and     forwarding logic responsive to the replacing logic and programmed to forward said single label stack protocol message to a downstream neighboring (next hop) interior router in said second autonomous system.

12. The program product of claim 11 comprising:

first label switched path establishing logic programmed to establish an incoming label switched path over said first autonomous system and associate said first label with said incoming label switched path;

second label switched path establishing logic responsive to said first label switched path establishing logic and programmed to establish an outgoing label switched path over said second autonomous system;

label distribution logic programmed to obtain said second label from said downstream neighboring (next hop) interior router in said second autonomous system;

mapping logic programmed to map said first label from said first autonomous system to said second label in said second autonomous system;

receiving logic programmed to receive from said interior router in said first autonomous system said protocol message including said first label;

replacing logic response to said receiving logic and programmed to replace said first label with said second label in said protocol message; and     forwarding logic responsive to said replacing logic and programmed to forward said protocol message to said downstream neighboring (next hop) interior router in said second autonomous system.

13. The program product of claim 12, wherein said second label switched path establishing logic comprises Label Distribution Protocol logic.

14. The program product of claim 12, wherein said label distribution logic comprises Label Distribution Protocol logic programmed to establish a Label Distribution Protocol session with said downstream neighboring (next hop) interior router and receive said second label associated with said downstream neighboring (next hop) interior router in said second autonomous system via said Label Distribution Protocol session.

15. The program product of claim 12, wherein said mapping logic is programmed to maintain a label information base and to create in said label information base a label information base entry mapping said first label from said first autonomous system to said second label in said second autonomous system.

\* \* \* \* \*